US009694444B2

(12) United States Patent
Mottin

(10) Patent No.: US 9,694,444 B2
(45) Date of Patent: Jul. 4, 2017

(54) PROTECTION COVER FOR A SPRAY NOZZLE DURING A HARDFACING PROCESS

(71) Applicant: SNECMA, Paris (FR)

(72) Inventor: Jean-Baptiste Mottin, Poitiers (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/905,623

(22) PCT Filed: Jul. 15, 2014

(86) PCT No.: PCT/FR2014/051813
§ 371 (c)(1),
(2) Date: Jan. 15, 2016

(87) PCT Pub. No.: WO2015/007988
PCT Pub. Date: Jan. 22, 2015

(65) Prior Publication Data
US 2016/0167171 A1    Jun. 16, 2016

(30) Foreign Application Priority Data

Jul. 17, 2013  (FR) ...................... 13 57037

(51) Int. Cl.
*B23K 26/34*  (2014.01)
*B23K 26/144* (2014.01)
(Continued)

(52) U.S. Cl.
CPC ............ *B23K 26/34* (2013.01); *B05B 15/001* (2013.01); *B23K 26/127* (2013.01);
(Continued)

(58) Field of Classification Search
CPC .. B23K 26/127; B23K 26/128; B23K 16/144; B23K 16/1462; B23K 26/34; B23K 26/342; B05B 15/001
See application file for complete search history.

(56) References Cited

U.S. PATENT DOCUMENTS

| 5,477,026 A * | 12/1995 | Buongiorno | ......... B23K 26/144 |
|---|---|---|---|
| | | | 219/121.64 |
| 6,025,571 A * | 2/2000 | Walters | .............. B23K 26/1482 |
| | | | 219/121.67 |
| 6,593,540 B1 | 7/2003 | Baker et al. | |
| 7,605,346 B2 * | 10/2009 | Harris | ..................... B23K 26/34 |
| | | | 219/121.63 |
| 2006/0065650 A1 * | 3/2006 | Guo | ..................... B23K 26/144 |
| | | | 219/121.84 |

(Continued)

FOREIGN PATENT DOCUMENTS

JP    2012-228698 A  *  11/2012

OTHER PUBLICATIONS

International Preliminary Report on Patentability and the Written Opinion of the International Searching Authority as issued in International Patent Application No. PCT/FR2014/051813, dated Jan. 19, 2016.

(Continued)

*Primary Examiner* — Geoffrey S Evans
(74) *Attorney, Agent, or Firm* — Pillsbury Winthrop Shaw Pittman LLP

(57) ABSTRACT

A protection cover suitable for being placed between a spray nozzle and a metal part during a process of resurfacing the metal part, the protection cover including a side wall extending along a reference axis, the side wall including an inner surface and an outer surface, the side wall having a lower end and an upper end, the side wall being perforated by at least one lateral gas inlet port, the lower end of the side wall being perforated by a notch into which a portion of the metal part can be inserted, the upper end of the side wall being provided with an opening into which a portion of the spray (Continued)

nozzle can be inserted. The inner surface of the side wall includes at least one frustoconical portion.

10 Claims, 2 Drawing Sheets

(51) Int. Cl.
B05B 15/00 (2006.01)
B23K 26/12 (2014.01)
B23K 26/14 (2014.01)
B23K 26/342 (2014.01)
B23K 101/00 (2006.01)
B23K 101/34 (2006.01)

(52) U.S. Cl.
CPC .......... *B23K 26/128* (2013.01); *B23K 26/144* (2015.10); *B23K 26/1462* (2015.10); *B23K 26/342* (2015.10); *B23K 2201/001* (2013.01); *B23K 2201/35* (2015.10)

(56) References Cited

U.S. PATENT DOCUMENTS

| 2006/0266740 | A1* | 11/2006 | Sato | B23K 26/144 |
| | | | | 219/121.63 |
| 2007/0071907 | A1* | 3/2007 | Stiles | B23K 26/1476 |
| | | | | 427/554 |
| 2007/0175874 | A1 | 8/2007 | Beeson et al. | |
| 2011/0089151 | A1* | 4/2011 | Miyagi | B23K 26/147 |
| | | | | 219/121.66 |
| 2015/0114938 | A1* | 4/2015 | Mottin | B22F 3/1055 |
| | | | | 219/76.14 |
| 2016/0023306 | A1* | 1/2016 | Arjakine | B23K 26/1476 |
| | | | | 219/76.1 |

OTHER PUBLICATIONS

International Search Report as issued in International Patent Application No. PCT/FR2014/051813, dated Sep. 2, 2014.

* cited by examiner

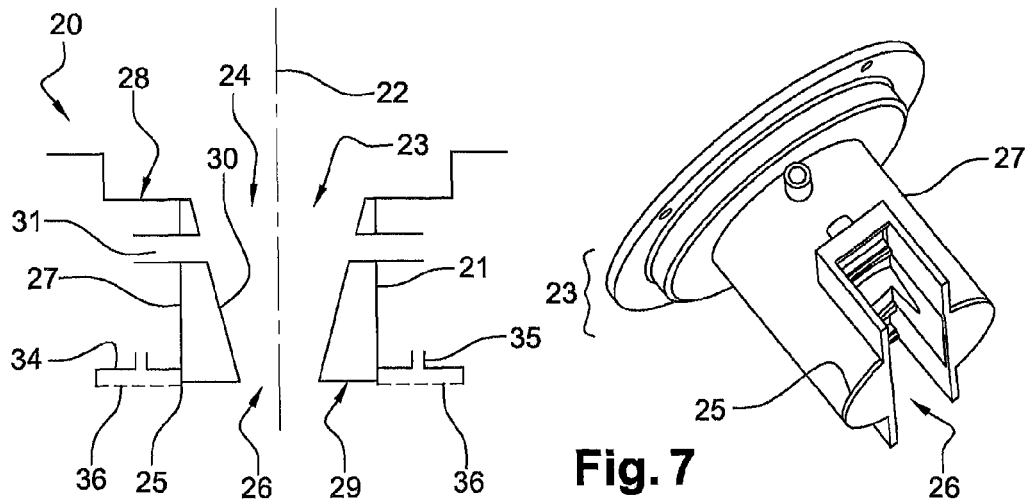
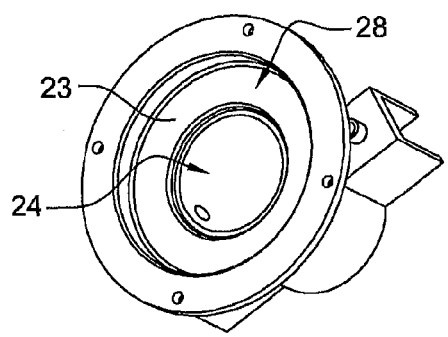
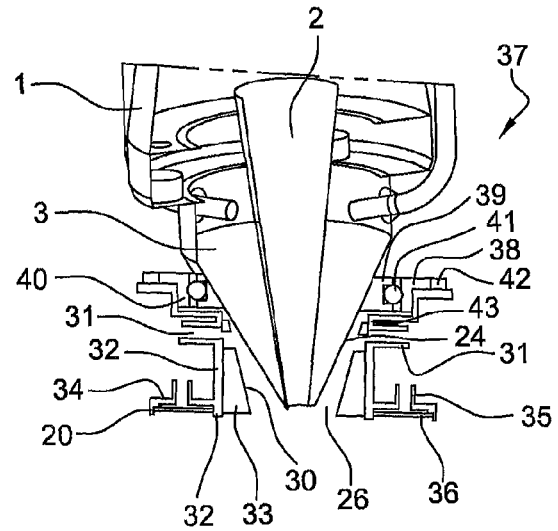
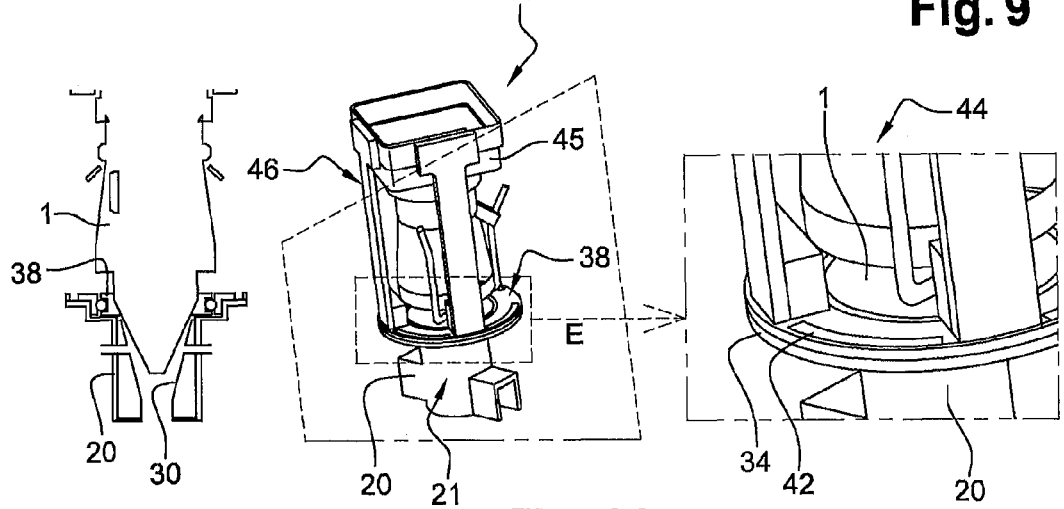

PROTECTION COVER FOR A SPRAY NOZZLE DURING A HARDFACING PROCESS

CROSS-REFERENCE TO RELATED APPLICATIONS

This is the U.S. National Stage of PCT/FR2014/051813, filed Jul. 15, 2014, which in turn claims priority to French Patent Application No. 1357037, filed Jul. 17, 2013, the entire contents of all applications are incorporated herein by reference in their entireties.

TECHNICAL FIELD

The present invention relates to a protection cover enabling the portion of a metal part which is being hardfaced to be protected in order to avoid its oxidation. The invention also relates to a hardfacing device comprising such a protection cover.

STATE OF PRIOR ART

In the field of aeronautics, the use of hardfacing processes is common to repair metal parts and in particular to repair blades of one-piece blade disks, compressor or distributor blades. These hardfacing processes generally use a metal powder which is sprayed on the area to be repaired and which is fused by a laser beam. The damaged portion of the metal part can thus be reconstructed. Such hardfacing processes are implemented by means of spray nozzles similar to the one depicted in FIG. 1. Such a spray nozzle 1 comprises:
 a central duct 2 through which the laser beam is sprayed,
 a peripheral duct 3 which surrounds the central duct and through which the metal powder is sprayed.

However, the parts to be rebuilt are generally made of titanium, nickel, aluminium or even cobalt, and they consequently have a risk of oxidation during the hardfacing process. To solve this problem, prior art suggested an injection nozzle similar to the one of FIG. 2. This injection nozzle 1 comprises a system for injecting an inert gas, such as argon, through the central duct 2 so as to prevent gas from rising in the central duct. Furthermore, the nozzle of FIG. 2 comprises channels 4 for injecting an inert gas in the peripheral channel. These injection channels 4 enable an inert gas, such as argon and helium, to be injected in the peripheral duct so as to carry the metal powder. Such a device is for example described in U.S. Pat. No. 6,326,585.

However, this local protection by inert gases coming from the spray nozzle is not sufficient to prevent the part from oxidizing during its hardfacing.

To solve this problem, prior art suggested to add a protection cover between the metal part to be repaired and the spray nozzle. A spray nozzle provided with such a protection cover 10 is depicted in FIGS. 3 and 4. It generally comprises a cylindrical side wall 5 which has an upper end 6 able to contact the spray nozzle 1 and a lower end 7 able to contact the portion 8 of the metal part 9 to be repaired. The upper end 6 of the protection cover 10 is provided with a first transverse wall perforated by a cylindrical opening 11 into which a portion of the spray nozzle 1 can be inserted. The lower end 7 of the protection cover is provided with a second transverse wall 12 perforated by an inverted U-shaped notch 13 into which the portion 8 of the metal part 9 to be hardfaced can be inserted. Between these two ends, the side wall 5 of the protection cover delimits a hermetic enclosure into which an inert gas is injected so as to prevent the metal part from oxidizing during its hardfacing. To do so, the protection cover comprises at least one duct for feeding 14 an inert gas into the enclosure. This duct 14 opens into a port made in the side wall of the protection cover. Such a protection cover provides an inert area all around the metal part, and therefore enables the oxidation of the metal part to be limited during the hardfacing.

However, the applicant has noticed that in spite of such a protection cover, an oxidation of the metal part occurred during its hardfacing.

DISCLOSURE OF THE INVENTION

The aim of the invention is to solve the prior art drawbacks by providing a protection cover for a spray nozzle which better protects the metal part from oxidation during a hardfacing process.

Indeed, the applicant has noticed that the oxidation of the metal parts during the prior art hardfacing processes, in spite of the presence of protection covers, was due to turbulences of the flow gas which occur at the junction between the protection cover and the metal part to be hardfaced. Due to these turbulences, oxygen is sucked up between the protection cover and the metal part being hardfaced. Such a phenomenon is depicted in FIG. 5. This oxygen can thus enter the enclosure due to the disruptions 15 of the gas flow, which leads to oxidizing the metal part.

The aim of the invention is to solve the drawbacks of the prior art protection covers by eliminating the turbulences of the gas flow at the junction between the metal part and the protection cover.

To do so, the invention provides a protection cover the inner surface of which, between the lateral inert gas inlet port and the lower end of the protection cover, is no longer cylindrical but frustoconical. Thus, the inner surface of the protection cover is substantially parallel to the outer surface of the spray nozzle which is inserted into the protection cover, which enables the gas disruptions to be decreased in proximity to the lower end of the protection cover.

More precisely, a first aspect of the invention relates to a protection cover able to be placed between a spray nozzle and a metal part during a process of hardfacing the metal part, the protection cover comprising a side wall extending along a reference axis, the side wall comprising an inner surface and an outer surface, the side wall having a lower end and an upper end, the side wall being perforated by at least one lateral gas inlet port, the lower end of the side wall being perforated by a notch into which a portion of the metal part can be inserted, the upper end of the side wall being provided with an opening into which a portion of the spray nozzle can be inserted; the inner surface of the side wall comprising at least one frustoconical portion.

In other words, the inner surface of the side wall comprises at least one portion tilted with respect to the reference axis. Having an at least partly frustoconical inner surface enables the inert gases to be lead into the space between the outer surface of the nozzle and the inner surface of the protection cover without turbulences, so as to prevent air from rising at the lower end of the protection cover. The protection cover, the spray nozzle and at least a portion of the metal part thus form an airtight enclosure. This enclosure is more airtight than those of prior art so that it provides a better protection for the metal part when they are hardfaced.

The protection cover according to the invention can also have one or several of the following features taken independently or according to any technically possible combinations.

Advantageously, the portion of the inner surface which is frustoconical is the portion of the inner surface which is located between the lateral gas inlet port and the lower end of the side wall. Disruptions are therefore reduced at the junction between the metal part and the protection cover.

According to a preferred embodiment, all the inner surface of the side wall is frustoconical. Thus, the disruptions are most reduced at the junction between the metal part and the protection cover. Furthermore, this embodiment is simpler to manufacture.

According to a preferred embodiment, the inner surface of the side wall is tilted relative to the reference axis by an angle between 20 and 40°. To do so, such a tilt angle enables the inner surface of the side wall to be parallel or substantially parallel to the outer surface of most spray nozzles, which enables the air disruptions at the lower end of the side wall and therefore the air inlets in the protection cover through this lower end to be reduced.

According to different embodiments:
the side wall can be made in one piece; or
the side wall can comprise a cylindrical outer ring and an insert inserted in the outer ring, the insert having a frustoconical inner surface. This embodiment enables the prior art protection covers to be transformed into protection covers according to the invention by inserting the insert into these prior art protection covers.

The inert gas is preferably injected on the metal part to be hardfaced by means at least of the lateral port which preferably extends along an axis perpendicular to the reference axis. The lateral port enables the enclosure formed by the protection cover, the spray nozzle and at least a portion of the metal part to be filled with inert gas.

The protection cover preferably comprises a track radially protruding from the lower end of the side wall, the track being perforated by at least one additional gas inlet port. This additional port enables the protection of the metal part against oxidation to be reinforced since it enables an inner gas to be injected on the metal part in addition to the inert gas which is in the enclosure. The additional port preferably extends along an axis substantially parallel to the reference axis.

Advantageously, the protection cover further comprises a water break grate disposed in front of each additional port. This water break grate makes it possible to avoid a too strong jet of inert gas impinging on the metal part but a diffuse jet, which enables a better protection against oxidation.

The metal part to be hardfaced is preferably a blade having a leading edge. The notch of the protection cover preferably has a shape enabling it to fit closely the leading edge of the blade. More generally, the notch preferably has a shape enabling it to fit closely the shape of the portion of the metal part to be rebuilt.

The notch enables the volume around the part to be rebuilt to be minimized. Insofar as possible, the distance between the inner walls of the notch and the surface of the part is lower than 30 mm.

A second aspect of the invention relates to a hardfacing device for implementing a process for hardfacing a turbomachine metal part, the hardfacing device comprising:
a spray nozzle;
a protection cover according to the first aspect of the invention, a portion of the spray nozzle being inserted into the opening of the protection cover.

The hardfacing device according to the second aspect of the invention can also have one or several of the following features taken independently or according to any technically possible combinations.

The spray nozzle preferably has an outer surface parallel or substantially parallel to the inner surface of the protection cover. "Substantially parallel" means parallel by more or less 10°.

The spray nozzle preferably has a central duct able to be crossed by a laser and a peripheral duct able to be crossed by a metal powder. The peripheral duct preferably surrounds the central duct.

According to a preferred embodiment, the hardfacing device has sealing means disposed between the spray nozzle and the protection cover. These sealing means make it possible to make the enclosure formed by the protection cover, the nozzle and a portion of the metal part totally airtight.

These sealing means preferably have:
a first ferrule attached to the spray nozzle;
an intermediate part attached to the protection cover;
an O-ring connecting the first ferrule and the intermediate part.

Such sealing means prevent an air inlet into the enclosure, while allowing motions of the spray nozzle relative to the metal part. Indeed, during a hardfacing process, the laser beam must be coaxial to the powder flow. In other words, the focusing point of the laser beam must be at the same place as the inlet point of the powder flow. To do so, the spray nozzle must be able to be displaced in a plane perpendicular to the reference plane of the protection cover. Having sealing means allowing motions of the spray nozzle relative to the protection cover enables the protection cover to be held against the metal part so that the protection cover fits closely the portion of the metal part to be protected, while allowing motions of the spray nozzle in order to align the laser beam with the inlet point of the metal powder.

Furthermore, the intermediate part is preferably perforated by at least one hole arranged so as to enable rotation around the reference axis of the protection cover relative to the spray nozzle. The protection cover can rotate relative to the spray nozzle so as to follow the curvature of the end of the metal part.

A third aspect of the invention relates to a hardfacing system comprising:
a hardfacing device according to the second aspect of the invention;
laser emitting means able to emit a laser through a central duct of the spray nozzle, the protection cover being secured to the laser emitting means through at least one securing lug.

Securing the cover on the laser emitting means and not on the spray nozzle enables the motions of the protection cover relative to the spray nozzle to be allowed in order to optimize the protection of the metal part by the cover while allowing the alignment of the laser beam with the spray nozzle and more precisely with the inlet point of the metal powders sprayed by the spray nozzle. Furthermore, not directly securing the protection cover on the spray nozzle enables the risks of collision and damage of the nozzle to be reduced.

The length of the securing lug is preferably adjustable so as to be able to modify the position of the protection cover relative to the one of the spray nozzle.

A fourth aspect of the invention relates to a hardfacing system comprising:
- a spray nozzle;
- a protection cover;
- laser emitting means, the protection cover being secured on the laser emitting means.

The hardfacing system according to the fourth aspect of the invention can also comprise one or several additional features described with reference to the other aspects of the invention.

A fifth aspect of the invention relates to a hardfacing device comprising:
- a spray nozzle;
- a protection cover;
- sealing means disposed between the spray nozzle and the protection cover, the sealing means allowing motions of the protection cover relative to the spray nozzle.

The hardfacing device according to the fifth aspect of the invention can also comprise one or several additional features described with reference to the other aspects of the invention.

BRIEF DESCRIPTION OF THE FIGURES

Further features and advantages of the invention will appear upon reading the following description detailed, with reference to the accompanying figures, wherein:

FIG. 6 is a cross-section diagrammatic view of a protection cover according to an embodiment of the invention;

FIGS. 7 and 8 are perspective views of the cover of FIG. 6;

FIG. 9 is a cross-section diagrammatic view of a hardfacing device according to an embodiment of the invention;

FIG. 10 is a cross-section diagrammatic view of a hardfacing device according to another embodiment of the invention;

FIG. 11 is a perspective diagrammatic view of a hardfacing system according to an embodiment of the invention;

FIG. 12 is an enlargement of portion E of FIG. 11.

For the sake of clarity, identical or similar elements are marked by identical reference marks throughout the figures.

DETAILED DESCRIPTION OF AT LEAST ONE EMBODIMENT

Figure 1:
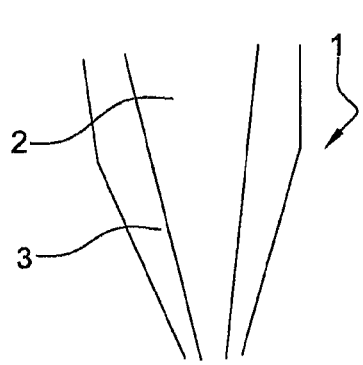
FIG. 1 is a cross-section diagrammatic view of a prior art spray nozzle.

A protection cover 20 adaptable on a spray nozzle for implementing a process for hardfacing a metal part is depicted in FIGS. 6 to 7. The protection cover 20 is intended to be placed between the spray nozzle and the portion of the metal part to be hardfaced during the hardfacing process so as to form an airtight enclosure around the portion of the metal part to be rebuilt.

The cover 20 comprises a side wall 21 which extends around a reference axis 22. The side wall 21 has a rotational symmetry around the reference axis 22. The side wall 21 has an upper end 23 provided with an opening 24 into which a spray nozzle can be inserted. The opening 23 is preferably made in a first transverse wall 28 attached to the upper end 23 of the side wall. The side wall 24 also has a lower end 25 provided with a notch 26 able to fit closely the shape of the portion of the metal part to be rebuilt. The notch 26 is preferably made in a second transverse wall 29 attached to the lower end 25 of the side wall.

The protection cover also comprises at least one lateral gas inlet port 31. In this case, the protection cover comprises two gas inlet ports 31. These two lateral gas inlet ports 31 are diametrically opposite in this embodiment. This or these lateral gas inlet port(s) is(are) made through the side wall 21. This or these lateral gas inlet port(s) 31 enable(s) an inert gas to be injected in the enclosure formed by a protection cover. This or these lateral gas inlet port(s) 31 preferably extend(s) perpendicular or substantially perpendicular to the reference axis.

The side wall 21 comprises an outer surface 27. The outer surface 27 is preferably cylindrical.

The side wall 21 also comprises an inner surface 30. The inner surface 30 is at least partly frustoconical, that is it comprises at least one tilted portion relative to the reference axis. More precisely, the inner surface 30 is frustoconical between the lateral gas inlet port(s) 31 and the lower end 25 of the side wall. According to a preferred embodiment, the inner surface 30 is totally frustoconical. The inner surface 30 is preferably tilted with respect to the reference axis, so that, when a spray nozzle is inserted into the opening 24, the outer surface of the spray nozzle is parallel or substantially parallel to the inner surface of the side wall, that is it is tilted by more or less 10° relative to the outer surface of the spray nozzle. To do so, the inner surface of the side wall is preferably tilted by an angle between 20 and 40° relative to the reference axis 22.

According to different embodiments:
- the side wall 21 can be formed by a one-piece wall which comprises a cylindrical outer surface and a frustoconical inner surface as shown in FIG. 6, or
- the side wall 21 can be formed by a cylindrical outer ring 32 and an insert 33 inserted in the outer ring 32, the insert having a frustoconical inner surface as shown in FIGS. 9 and 10.

The protection cover 20 also preferably comprises a track 34 which surrounds the lower end 25 of the side wall. The track 34 radially extends around the lower end 25 of the side wall. The track 34 is perforated by at least one additional port 35 for injecting an inert gas. In this embodiment, the track 34 is perforated by two additional ports 35 for injecting an inert gas on the metal part. These additional ports 35 enable an inner gas to be injected on the metal part, in the area of the metal part which is outside the protection cover, but in proximity to the protection cover, in order to reinforce the protection against oxidation. Each additional port 35 preferably extends parallel to the reference axis 22. The protection cover preferably comprises a water break grate 36 disposed in front of each additional port such that the gas jet exiting from this port is diffuse and not strong. Protection against oxidation of the part is thus improved.

The thus formed protection cover can therefore be placed so as to form an airtight enclosure around the tip of the spray nozzle which is inserted into the opening 24 of the protection cover and the portion of the metal part which is inserted into the notch 26. Inert gas is then injected in this hermetic enclosure by means of the gas inlet port 31. Air can not enter this enclosure thanks to the shape of the inner surface 30 of the side wall. The metal part can therefore be hardfaced while being protected against oxidation. Furthermore, an inert gas is injected around this enclosure by means of the additional ports 35, which further enables the protection of the metal part against oxidation to be reinforced.

Figure 2:
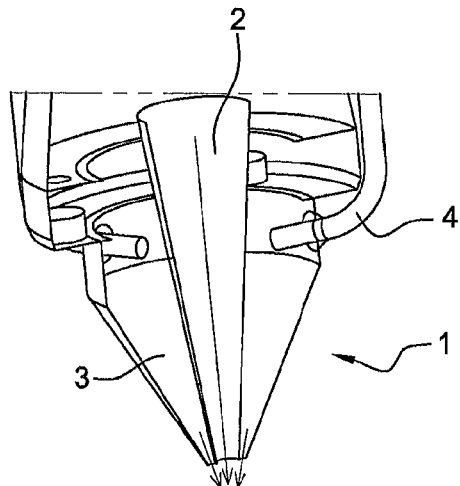
FIG. 2 is a cross-section diagrammatic view of another prior art spray nozzle.
Figure 3:
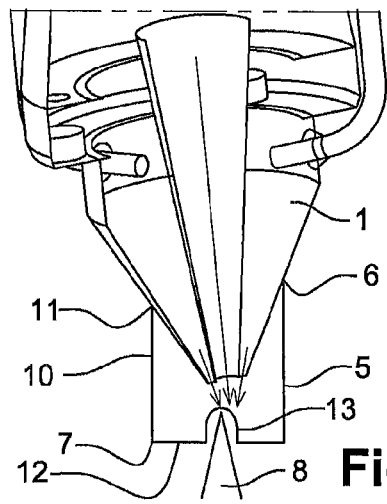
FIG. 3 is a cross-section diagrammatic view of a prior art spray nozzle provided with a prior art protection cover.
Figure 4:
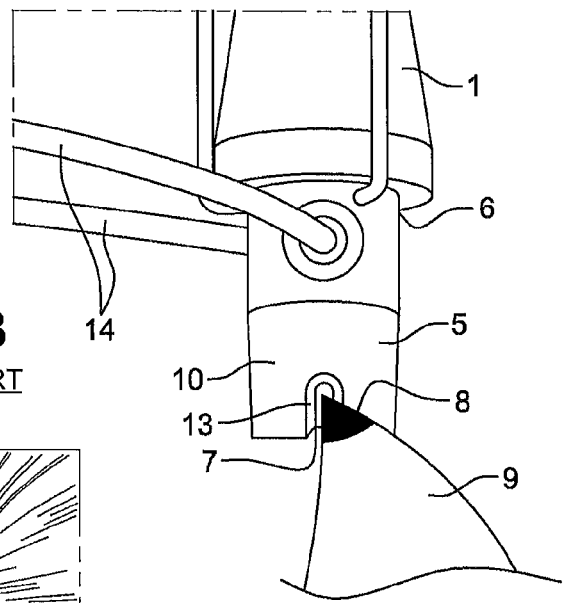
FIG. 4 is a perspective diagrammatic view of the nozzle and of the cover of FIG. 3.
Figure 5:
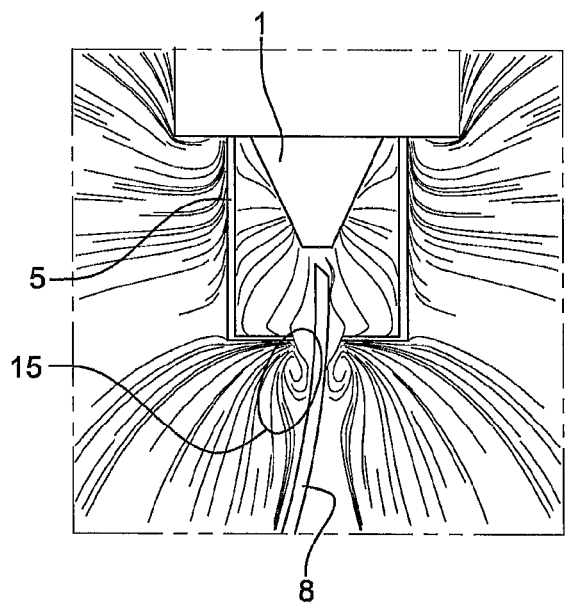
FIG. 5 is a cross-section diagrammatic view of the gas movements in the cover of FIG. 3.

FIG. 9 depicts a hardfacing device 37 according to an embodiment of the invention. This hardfacing device 37 comprises:

- a protection cover which can for example be identical to the one described with reference to FIGS. 7 to 8 and
- a spray nozzle 1. This spray nozzle 1 can for example be identical to the one described with reference to FIG. 2.

The spray nozzle 1 is inserted into the opening 23 of the upper end 25 of the protection cover 20. As depicted in FIG. 9, the outer surface 43 of the portion of the spray nozzle 1 which is inserted in the protection cover 20 is substantially parallel to the inner surface 30 of the side wall 21 of the protection cover, which enables the air turbulences to be reduced at the junction between the edges of the notch 26 and a metal part inserted into this notch. Substantially parallel means parallel by +/−10°.

The hardfacing device 37 also comprises sealing means 38 disposed between the spray nozzle 1 and the protection cover 20. These sealing means 38 provide the sealing between the spray nozzle 1 and the protection cover 20 while allowing motions between these two parts.

To do so, the sealing means 38 comprise:

- a first ferrule 39 attached to the spray nozzle 1;
- an intermediate part 40 attached to the protection cover 20;
- an O-ring 41 connecting the first ferrule 39 and the intermediate part 40. The O-ring 41 allows the motions between the first ferrule 39 and the intermediate part 40 and therefore between the spray nozzle 1 and the protection cover 20.

Furthermore, the intermediate part 40 is perforated by at least one hole 42 arranged so as to enable the rotation around the reference axis of the protection cover relative to the spray nozzle. The hole is preferably in the shape of a banana.

FIG. 10 shows a hardfacing device 37' according to another embodiment of the invention. This hardfacing device 37' comprises a spray nozzle 1 similar to the one of the hardfacing device 37 and a protection cover similar to the one described with reference to FIGS. 6 to 8, except that the inner surface 30 of the side wall 21 is not totally frustoconical, but only a portion of this inner surface is frustoconical.

FIGS. 11 and 12 depict a hardfacing system 44 according to an embodiment of the invention. This hardfacing system 44 comprises a hardfacing device similar to the one described with reference to FIG. 9 and laser emitting means 45 able to emit a laser through the central duct 2 of the spray nozzle 1. The protection cover 20 is secured to the laser emitting means 45 through at least one securing lug 46, in this case through four securing lugs 46. Due to this securing of the protection cover to the laser emitting means and to the presence of the sealing means allowing the motions between the protection cover and the spray nozzle, the spray nozzle can move relative to the assembly formed by the protection cover 20 and the laser emitting means 45, which enables the laser beam to be aligned with the inlet point of the metal powders. The notch 42 enabling the rotation of the protection cover relative to the spray nozzle can be better seen in FIG. 12.

Of course the invention is not limited to the embodiments described with reference to the figures and alternatives could be considered without departing from the scope of the invention.

The invention claimed is:

1. A protection cover able to be placed between a spray nozzle and a metal part during a process of hardfacing the metal part, the protection cover comprising a side wall extending along a reference axis, the side wall comprising an inner surface and an outer surface, the side wall having a lower end and an upper end, the side wall being perforated by at least one lateral gas inlet port, the lower end of the side wall being perforated by a notch into which a portion of the metal part is insertable, the upper end of the side wall being provided with an opening into which a portion of the spray nozzle is insertable, wherein the inner surface of the side wall comprises at least one frustoconical portion.

2. The protection cover according to claim 1, wherein the side wall has a rotational symmetry around the reference axis and the inner surface of the side wall is tilted with respect to the reference axis by an angle between 20 and 40°.

3. The protection cover according to claim 1, wherein the side wall comprises a cylindrical outer ring and an insert inserted in the outer ring, the insert having a frustoconical inner surface.

4. The protection cover according to claim 1, further comprising a track radially protruding from the lower end of the side wall, the track being perforated by at least one additional gas inlet port, the additional gas inlet port extending along an axis substantially parallel to the reference axis.

5. The protection cover according to claim 4, further comprising a water break grate disposed in front of each additional gas inlet port.

6. A hardfacing device implementing a process for hardfacing a turbomachine metal part, the hardfacing device comprising:

- a spray nozzle, and
- a protection cover according to claim 1, a portion of the spray nozzle being inserted in the opening of the protection cover.

7. A hardfacing device according to the claim 6, further comprising a seal disposed between the spray nozzle and the protection cover.

8. The hardfacing device according to claim 7, wherein the seal comprises:

- a first ferrule attached to the spray nozzle;
- an intermediate part attached to the protection cover, and
- an O-ring connecting the first ferrule and the intermediate part.

9. A hardfacing device according to claim 8, wherein the intermediate part is perforated by at least one hole arranged so as to enable a rotation around the reference axis of the protection cover relative to the spray nozzle.

10. A hardfacing system comprising:

- a hardfacing device according to claim 6,
- a light source configured to emit a laser beam through a central duct of the spray nozzle,
- the protection cover being secured to the laser emitting device by at least one securing lug.

* * * * *